Figure 1:
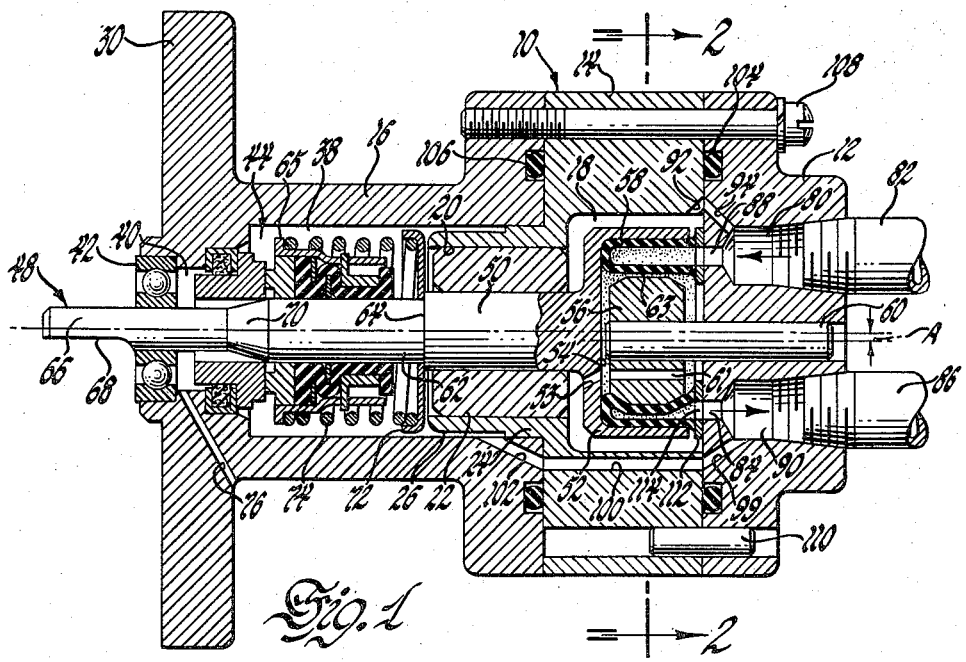

April 21, 1959    A. D. McDUFFIE    2,882,830
DISTORTIONABLE CHAMBER PUMP
Filed June 6, 1957

INVENTOR.
Archie D. McDuffie
BY
J. W. Lovett
ATTORNEY.

United States Patent Office 2,882,830
Patented Apr. 21, 1959

2,882,830

DISTORTIONABLE CHAMBER PUMP

Archie D. McDuffie, Berkley, Mich., assignor to General Motors Corporation, Detroit, Mich., a corporation of Delaware Application June 6, 1957, Serial No. 664,018

3 Claims. (Cl. 103—117)

This invention relates to pumps and more particularly to liquid pumps in which the propulsive force of the fluid is induced by distortion of chambers formed in resilient material of the pump structure.

In recent years a need has arisen for a pump suitable for developing a flow of liquid in low volume but at high pressure such as needed in forcing fuel through the fuel systems of automobile engines. In such pumps provision must be made for avoiding excessive leaks or heating of the fluid despite the elevated pressure and/or high speed operation.

An object of the present invention is to provide an improved pump of the distortionable chamber type. Another object is to provide a distortionable chamber pump in which fluid pressure is utilized to maintain a seal to minimize leakage.

A feature of the present invention is a pump having a port plate arranged in sealed relation with respect to the pump body and bonded to a distortionable diaphragm of normally toroidal shape. Another feature pertains to a liquid pump in which a distortionable diaphragm is embodied and which may be subjected to fluid pressure maintaining a liquid seal. Another feature is a port plate adapted to be urged into sealing and slidable relation with a pump body by fluid pressure generated by the pump as well as by spring means embodied in the pump structure.

These and other important features of the invention will now be described in detail in the specification and then pointed out more particularly in the appended claims.

Figure 2:
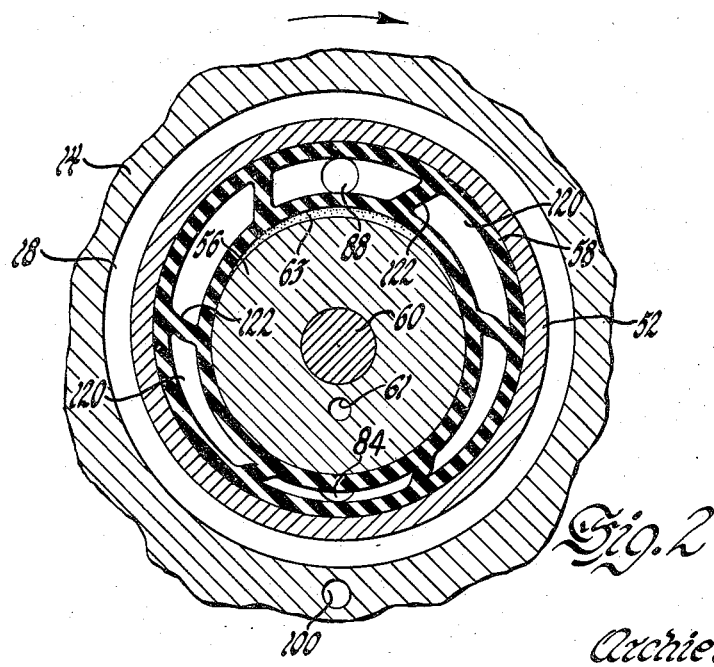

In the drawings:

Fig. 1 is a sectional view taken along the axis of a fuel pump in which the present invention is embodied; and Fig. 2 is a sectional view taken in the direction of the arrows 2—2 in Fig. 1 and drawn to an enlarged scale.

In the drawings the body of the pump is generally indicated at 10 and is shown as embodying a cover portion 12, an intermediate portion 14 and a supporting portion 16. The intermediate portion is so formed as to define a cylindrical space 18 coaxial with a bore 20 of reduced diameter for supporting a bearing 22. The exterior contour of the intermediate portion 14 is reduced to form a sleeve 24 through which the bore 20 extends. This sleeve is further reduced in diameter as at 26 for a purpose which will be made clear.

The support portion 16 of the pump body is provided at one end with a flange 30 of large diameter which may be employed in any suitable way to mount the pump firmly with relation to some structure such as an engine block. The support portion 16 is so made as to define a sealed chamber 38 and a suitable reduced passage 40 for accommodating a bearing 42 and a sealing arrangement 44. The latter is not specifically described herein as it may take any of numerous well known forms. A rotor generally indicated at 48 has a main solid portion 50 journaled in the bearing 22, an enlarged end 52 located within the space 18 and recessed as at 54 for the reception of a roller 56, and a distortionable diaphragm 58 of normally toroidal shape prior to distortion. The wall of the enlarged end 52 has a passage 53 communicating with the recess 54. The diaphragm is of resilient material such as synthetic rubber and substantially fills the recess 54 around the roller 56. The latter is so mounted as freely to rotate on a pin 60 mounted with its axis a short distance A away from and parallel with the axis of the rotor 50. This eccentricity, of course, will bring about the pumping action as will be seen from the subsequent explanation. The roller 56 is drilled as at 61. The pin 60 is fixedly mounted on and fixed to the cover portion 12. An intermediate solid portion 62 of the rotor 50 is reduced in diameter so that shoulder 64 is formed between the portions 62 and 50. One end 66 of the rotor protrudes from the bearing 42 which supports it and has a flattened surface 68 facilitating the connection of the rotor to a driving mechanism not shown. A tapered shoulder 70 is formed between the rotor portions 66 and 62. A flanged washer 72 circumvents the rotor portion 62 and is urged against the shoulder 64 by means of a coil spring 74 one end of which bears against a flange 65 of the sealing arrangement 44. A drain passage 76 is formed in the support portion 30 to remove any fluid which may be in the passage 40 and in excess around the bearing 42. It will be noted that the flange washer 72 at no time contacts the end of the sleeve 24 or the bearing 22.

The cover portion 12 is provided with an inlet port 80 with a supply pipe 82 connected thereto and also with an outlet port 90 with an outlet pipe 86 connected thereto. Communication is had between each of the ports 80 and 90 and the pump interior by means of passages 88 and 84, respectively. The cylindrical wall portion defining the space 18 is ported at 92 to communicate at right angles with a passage 94 extending into the cover portion 12 to the inlet port 80. The body portions 12, 14 and 16 are also ported at 99, 100 and 102, respectively, whereby fluid may pass from the outlet port 84 to the sealed chamber 38.

Resilient O-rings 104 and 106 are arranged in suitable annular channels of the body portions 12 and 16 and are effective to seal the abutting surfaces of the body portions. It will be understood that the latter are held in assembly by means of a number of bolts such as the bolt 108 and a suitable locating pin 110.

An annular port plate 112 bearing six arcuate apertures 114 is so located within the space 18 that those apertures are adapted consecutively to register and communicate with the ports 88 and 90 upon rotation of the rotor 50 as will subsequently appear.

The normally toroidal shaped diaphragm 58 is bonded to the port plate 112 at its inner and outer margins and the diaphragm is so made as to define six distortionable chambers 120 separated by non-radial webs 122. The apertures 114 each conform with the normal arcuate form of the chamber 120 with which it communicates.

In operation, it being assumed that gasoline is supplied the pipe 82, power is applied to the end 66 of the rotor 48 to rotate the latter. When the rotor 48 revolves, the eccentricity in mounting of the roller 56 causes fluid from the port 80 to enter each of the chambers 120 consecutively as they assume their normal and undistorted shape. With continued joint rotation of the rotor, diaphragm and port plate 112, the latter seals off each chamber 120 after it is filled with fluid and that chamber becomes increasingly constrained and distorted as it approaches the port 90. As the synthetic rubber of the diaphragm and the gasoline are substantially incompressible, the diaphragm will expand in a direction parallel with the rotor axis and the webs 122 will be distorted. As a result of the expansion referred to, the rotor will be forced a slight distance to the left, as viewed in Fig. 1, and add to the spring loading. This also increases the sealing effect at the port plate 112. When a gasoline filled chamber 120 has reached a position of registry with the port 90, its distortion has reached its maximum and the strong tendency of the diaphragm to regain its normal shape forces the gasoline out through the discharge line 86. As that chamber 120 continues its rotation it continues to regain its normal shape under negative pressure until charging position is again obtained. In Fig. 2, an arcuate space 63 is shown between roller 56 and the diaphragm 58 but an operative arrangement need not allow for such a space.

The space 18 becomes filled with fluid under relatively low pressure because of the passages 92 and 94. Fluid from the high pressure side—i.e.—from the port 84, flows through the passages 99, 100, 102 and the chamber defined by the reduced diameter portion 26 of the rotor to assist the spring 74 in urging the port plate against the interior wall of the cover portion 12 to give the sealing effect required between the relatively moving parts.

It is clear that the apertures 114 in the port plate 112 should be elongated in order to give sufficient time for each chamber 120 to fill and then empty. It is also noted that the force exerted by the port plate 112 against the inside wall of the cover portion 12 is the sum of the force of the spring 74 plus the outlet pressure axially effective in the sealed chamber 38 on the rotor plus the inlet pressure axially effective on the rotor within the space 18 minus the inlet pressure axially effective on the rotor within the recess 54. By controlling or modifying the passages in the pump body portions desired pressures may be maintained within the space 18 and the sealed chamber 38. The roller 56 is preferably free running on its shaft 60 and rotates with the diaphragm and no bond is required between the latter and the rotor. The differential fluid pressure exerted on the bearing 20 will cause a small flow of fluid through the latter for lubrication purposes.

I claim:

1. A pump comprising a pump body, a space in said body, said body having an inlet port and an outlet port extending to said space, a rotor journaled in said body with one end in said space, a recess in said one end facing said ports, a port plate having multiple apertures and slidable relative to said body to place said apertures consecutively in registry with each of said ports, a roller in said recess and mounted on said body with its axis parallel with the axis of said rotor, a distortionable normally toroidal shape diaphragm substantially filling the said recess around said roller and defining an annular arrangement of multiple chambers individually communicating with at least one of said apertures, and said diaphragm being bonded at its inner and outer peripheries to said port plate to rotate with the latter as said rotor is rotated.

2. A pump comprising a pump body having an interior wall partly defining a space in the body, ports extending from the exterior of said body through said interior wall to said space, a rotor journaled in said body with its axis substantially perpendicular to said wall, one end of said rotor extending into said space and having a recess facing said wall, a port plate having multiple apertures arranged around the axis of said rotor and adapted to communicate with said ports, a roller rotatively mounted in said recess in eccentric relation with the latter and the rotor axis, a resilient diaphragm of normally toroidal shape substantially filling the said recess around said roller and defining multiple separate distortionable chambers each communicating with at least one of said apertures, and said diaphragm being bonded to said port plate whereby the latter may be rotated together with the diaphragm by rotating the rotor.

3. A pump such as set forth in claim 2 including passages in said body conducting fluid from one of said ports to an interior zone of said body where said fluid may exert pressure urging said rotor in an axial direction whereby sealing pressure is effected between the port plate and the wall.

References Cited in the file of this patent

UNITED STATES PATENTS

| | | |
|---|---|---|
| 2,070,738 | Klein | Feb. 16, 1937 |
| 2,336,580 | Yeatman | Dec. 14, 1943 |
| 2,617,362 | Parsons | Nov. 11, 1952 |